March 1, 1949.　　F. A. GRUETJEN　　2,463,101
METHOD OF MAKING AIRPLANE PROPELLERS
Filed Feb. 18, 1944
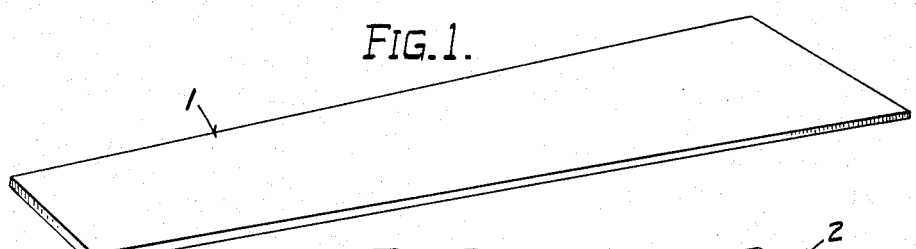
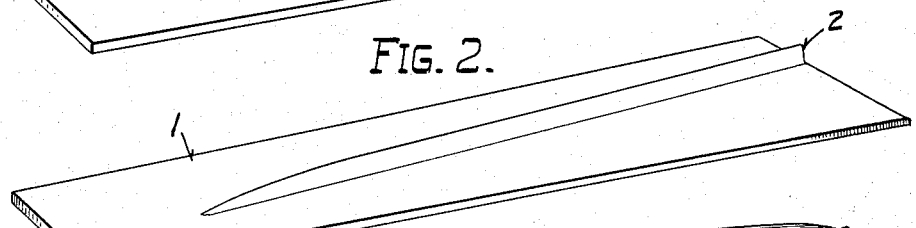
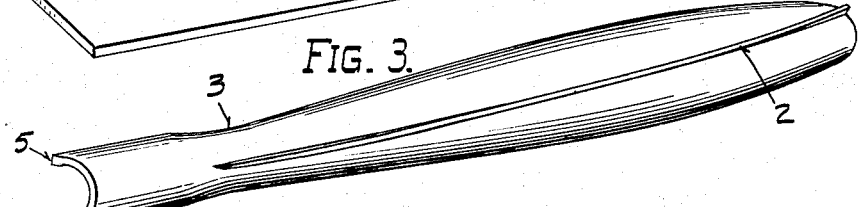
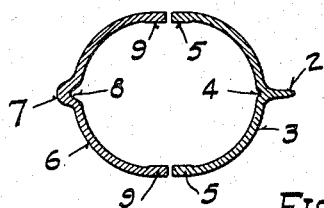
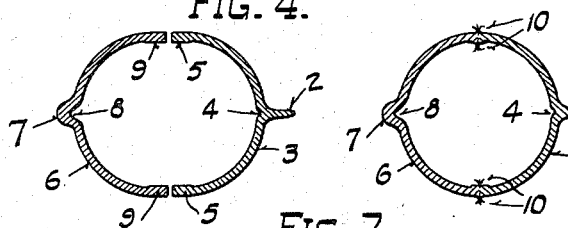
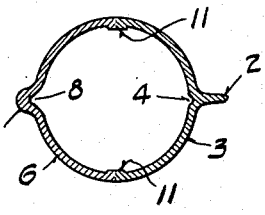
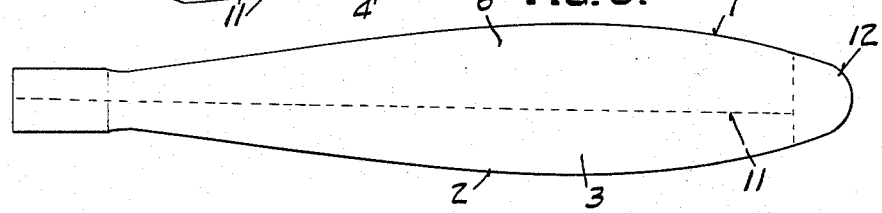
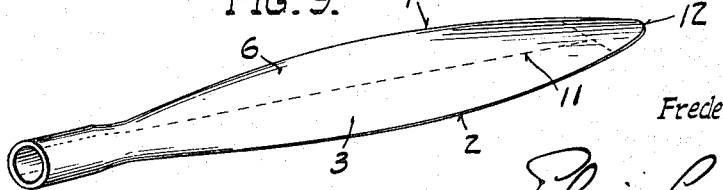
Frederick A. Gruetjen
INVENTOR.
BY
ATTORNEY.

Patented Mar. 1, 1949

2,463,101

UNITED STATES PATENT OFFICE 2,463,101

METHOD OF MAKING AIRPLANE PROPELLERS

Frederick A. Gruetjen, Milwaukee, Wis., assignor to A. O. Smith Corporation, Milwaukee, Wis., a corporation of New York Application February 18, 1944, Serial No. 522,871

7 Claims. (Cl. 29—156.8)

This invention relates to a method of making an airplane propeller of the hollow steel type. The invention is applicable to the making of either an entire propeller blade or to the making of longitudinal tubular sections of a blade.

The object of the invention is to make a welded hollow steel propeller blade with fewer welds and under conditions of design and fabrication that facilitate the welding and cleaning operations.

Another object is to reduce the number of seams required and simplify the welding operations.

The invention is illustrated in the accompanying drawings in which:

Figure 1 is a perspective view of a blank from which one section of the blade is made;

Fig. 2 is a similar view showing the central ridge upset therein to provide a trailing edge for the blade;

Fig. 3 is a similar view showing the forming of the blank to semi-cylindrical shape;

Fig. 4 is a transverse section through two blanks assembled in position for welding;

Fig. 5 is a view similar to Fig. 4 after completion of the welding step;

Fig. 6 is a similar view after trimming of the weld;

Fig. 7 is a view illustrating the flattening of the blank to blade shape;

Fig. 8 is a plan view of the blade showing the welding thereto of a tip; and

Fig. 9 is a perspective view of the finished blade before machining of the shank and balancing.

The propeller blade is constructed of longitudinally extending sections welded together along longitudinal seams, and the sections may extend substantially for the full length of the blade or they may each be separated into transverse sections to facilitate forming of the same. Such transverse sections are then welded together along transverse seams, preferably after welding along longitudinal seams and forming the same to blade shape. The process illustrated involves the fabrication of sections which are substantially the length of the blade, welding the same and then forming the same to blade shape and securing a tip thereto.

In carrying out the process, a blank 1 which constitutes a metal plate of substantial thickness at one end, corresponding to the thickness of the shank of the propeller blade, and tapered in thickness at the other end, corresponding to the tapered thickness of the blade portion of the propeller, is heated and upset in suitable dies to provide a longitudinal ridge 2 on one side extending somewhat diagonally across the center line to correspond with the twist of the trailing edge of the finished blade.

After coining of the ridge 2, the blank is trimmed and then pressed between dies to shape the same into a semi-tubular section 3 with an inside channel 4 corresponding to the ridge 2 and with its side edges 5 extending substantially straight and generally at right angles to a transverse plane joining the same.

The complemental section 6 is formed in the same manner from a similar blank and has a longitudinal ridge 7 corresponding to the leading edge of the blade, an inside channel 8, and side edges 9, the latter being parallel to the edges 5 of the blank 1.

The edge portions 5 and 9 are thicker than the adjacent blank wall to provide a thicker welded joint.

The sections 3 and 6 are of varying cross section from end to end to correspond with the several portions of the blade, the shank portion and the outer tip end of the blade being of smallest diameter. After forming, the sections 3 and 6 are assembled in a suitable welding machine and welded together, preferably by electric flash welding, as shown in Fig. 5. In this step, the edge portions 5 and 9 are flashed away.

The welding flash 10 is then trimmed from the inside and outside of the two welds, leaving a weld bead 11 which is slightly thicker than the adjacent blank wall and of substantial width. The blank being generally circular in cross section, it is relatively easier to remove the inside flash than where the blanks are of air foil contour prior to welding.

The welded blank is next flattened between dies to air foil contour. The channels 4 and 8 serve to form the inside surface contour immediately beneath the respective trailing and leading edges of the blade. The twist or pitch of the blade is provided in this flattening operation to correspond with the spiral position of the ridges 2 and 7. The weld bead 11 extends diagonally across the center line of the foils and is parallel to the center line in the cylindrical shank part of the blade.

A tip 12 is then butt welded to the outer end of the blank completing the blade. The shank is machined and the blade may then be suitably heat treated and balanced.

Where fusion welding of the sections 3 and 6 is employed, it will be unnecessary to provide the excess metal in edge portions 5 and 9 to be flushed away. It is also possible to provide the twist in ridges 2 and 7 after welding of the structure by placing it in a suitable die which will effect a twist in the entire structure. In such event, ridges 2 and 7 will be formed along the center line of the blanks.

Various embodiments of the invention may be employed within the scope of the accompanying claims.

I claim:

1. In the manufacture of hollow metal propeller blades, the steps comprising forming a longitudinal ridge on one side of a plate of longitudinally tapered thickness, forming said plate transversely to semi-tubular and semi-circular shape with a substantial distance between its side edges, forming a second plate to semi-tubular and semi-circular shape complemental to said first plate, assembling said blanks with their corresponding longitudinal edges in abutting relation, welding said edges together to form a welded structure of generally circular shape, and finally pressing the welded structure to air foil contour having the pitch desired in the finished blade and with the welds extending longitudinally of the foil portion of the blade, said ridge constituting one of the edges of the blade and said tapered thickness providing a blade of gradually decreasing thickness from the inner to the outer end.

2. In the manufacture of hollow metal propeller blades, the steps comprising forming a longitudinal ridge in one side of each of two blanks tapered in thickness from end to end and forming said blanks into two separate complementary longitudinally extending sections of substantially semi-circular section with longitudinally tapered thickness and varying diameter and with the longitudinally extending ridge of each section corresponding to an edge of the finished blade, welding said sections together to provide a generally circular blank, trimming the inner and outer surfaces of the welds, and thereafter pressing the blank to air foil contour having the pitch desired in the finished blade and with each ridge constituting an edge of the blade.

3. In the manufacture of hollow metal propeller blades, the steps comprising forming a longitudinal ridge in one side of each of two blanks tapered in thickness from end to end and forming said blanks into two separate complementary longitudinally extending sections of substantially semi-circular section with longitudinally tapered thickness and varying diameter and with the longitudinally extending ridge of each section corresponding to an edge of the finished blade and having edge portions extending parallel to one another for facilitating flash welding of the same, electric flash welding the corresponding edges of said sections together to provide a generally circular blank, trimming the flash away, and thereafter pressing the blank to air foil contour having the pitch desired in the finished blade and with each ridge constituting an edge of the blade.

4. In the manufacture of hollow metal propeller blades, the steps comprising forming a longitudinal ridge in one side of each of two blanks tapered in thickness from end to end and forming said blanks into two separate complementary longitudinally extending sections of substantially semi-circular section with longitudinally tapered thickness and varying diameter and with the longitudinally extending ridge of each section disposed spirally of the blank to correspond to an edge of the finished blade and having edge portions extending parallel to one another for facilitating flash welding of the same, electric flash welding the corresponding edges of said sections together to provide a generally circular blank, and thereafter pressing the blank to air foil contour and blade shape with each ridge constituting an edge of the blade.

5. In the manufacture of hollow metal propeller blades, the steps comprising forming a diagonally disposed longitudinally extending ridge on each of a pair of flat plates with each respective ridge corresponding to an edge of the finished blade, forming said plates into two separate complementary longitudinally extending sections of substantially semi-circular section with longitudinally tapered thickness and varying diameter and edge portions of greater thickness than the adjacent blank wall, butt welding the corresponding edges of said sections together to provide a generally circular blank, trimming said welds and leaving said thickened portion to constitute a reinforcing bead at the weld, and thereafter pressing the blank to air foil contour having the pitch desired in the finished blade with each ridge constituting an edge of a finished blade and with said beads extending diagonally across the longitudinal center line of the respective foil surfaces.

6. In the manufacture of hollow metal propeller blades, the steps comprising forming a longitudinally extending ridge on each of a pair of flat plates with each respective ridge corresponding to an edge of the finished blade, forming said plates into two separate complementary longitudinally extending sections of substantially semi-circular section with longitudinally tapered thickness and varying diameter and edge portions of greater thickness than the adjacent blank wall, butt welding the corresponding edges of said sections together to provide a generally circular blank, trimming said welds and leaving said thickened portion to constitute a reinforcing bead at the weld, and thereafter pressing the blank to air foil contour with said edge portion and body of the blade being twisted to the pitch desired in the finished blade and said ridges constituting corresponding edges of the blade.

7. In the manufacture of hollow metal propeller blades, the steps comprising forming a spirally disposed longitudinally extending ridge on each of a pair of flat plates with each respective ridge corresponding to an edge of finished blade, forming said plates into two separate complementary longitudinal sections of substantially semi-circular section with channels disposed on the inside of each ridge, welding said sections together to provide a generally circular blank, and thereafter pressing the blank to air foil contour having the pitch desired in the finished blade and with said channels forming the inside surface contour immediately beneath the leading and trailing edges of the blade.

FREDERICK A. GRUETJEN.

REFERENCES CITED

The following references are of record in the file of this patent:

UNITED STATES PATENTS

| Number | Name | Date |
| --- | --- | --- |
| 1,310,130 | Murray | July 15, 1919 |
| 1,688,421 | Holmes | Oct. 23, 1928 |
| 1,793,218 | Free | Feb. 17, 1931 |
| 1,942,222 | Squires | Jan. 2, 1934 |
| 1,989,796 | Firth | Feb. 5, 1935 |
| 2,007,776 | Smith | July 9, 1935 |
| 2,138,127 | Squires | Nov. 29, 1938 |
| 2,231,772 | Nelson | Feb. 11, 1941 |
| 2,262,029 | McKee | Nov. 11, 1941 |
| 2,298,132 | Johnson | Oct. 6, 1942 |
| 2,427,785 | Hoover | Sept. 23, 1947 |

FOREIGN PATENTS

| Number | Country | Date |
| --- | --- | --- |
| 219,477 | Great Britain | July 31, 1924 |
| 379,779 | Great Britain | Sept. 8, 1932 |